United States Patent Office 2,782,235
Patented Feb. 19, 1957

2,782,235

PREPARATION OF C-NITROSODIARYLAMINES

Robert Lazare Lantz, Paris, and Gilbert Henri Victor Kremer, Ermont, France, assignors to Compagnie Francaise des Matieres Colorantes, Paris, France, a French body corporate No Drawing. Application January 4, 1955,
Serial No. 479,866

5 Claims. (Cl. 260—576)

The present invention relates to improvements in the preparation of C-nitrosodiarylamines.

The C-nitrosodiarylamines are generally prepared by the transposition of the N-nitrosodiarylamines, which are usually obtained by the introduction of a nitroso group into the corresponding diarylamines. Moreover, in certain cases, the two reactions can be effected simultaneously or successively without the intermediate product being isolated. Hitherto, the transposition has preferably been effected in an anhydrous medium in the presence of methyl or ethyl alcohol. The need to work in the absence of water has been recognised by a number of authors; in particular, by Marqueyrol and Muraour (Bulletin Ste Chimique, 1914, 15, page 510), and by Wyler, Kersey and Schmith (U. S. Patent No. 2,046,356). French Patent No. 945,183, nevertheless, indicates that the alcohol employed, which is methyl alcohol in the examples therein, can contain a little water (1%–5%), but since the procedure which it describes is the use of an acid chloride, such as phosgene, which reacts on the solvents to give hydrochloric acid and to remove the water, the reaction medium is anhydrous in this case also.

The necessity of avoiding the presence of water is an important disadvantage of these processes. In fact, it necessitates the drying of the solvent employed e. g. methyl or ethyl alcohol, as well as the apparatus and the starting material, and the use of the hydrochloric acid required for the transposition in the anhydrous form. The use of the acid chlorides which have been recommended in order to avoid these disadvantages constitutes a tiresome complication.

It has now been found that the transposition of N-nitrosodiarylamines to C-nitrosodiarylamines may be carried out by the action of a halohydric acid, such as hydrochloric or hydrobromic acid, in the presence of water, provided that one or more alcohols containing more than two atoms of carbon in their molecule are added to the reaction medium. The reaction also gives good results when it is effected under the preceding conditions, but in the absence of water, it then has less practical interest.

The alcohols containing more than two atoms of carbon which may be used are, for example, normal propyl alcohol, isopropyl alcohol, normal butyl alcohol, isobutyl alcohol, tertiary butyl alcohol, amyl alcohol, isoamyl alcohol and cyclohexanol.

The two aryl nuclei of the N-nitrosodiarylamines employed as starting materials can be separated from each other as in N-nitroso - diphenylamine, - 3:3' - dimethyl - diphenylamine, -4-methoxydiphenylamine, -3-methoxydiphenylamine, -2-phenylamino-naphthalene, -1-phenylamino-naphthalene, or they may be connected by a bridge as in N-nitroso-carbazole.

The process can also be used for the preparation of C-nitrosodiarylamines by starting from the diarylamines without isolating the N-nitroso derivative. A reagent for the introduction of nitroso groups, such as for example a nitrite, is then reacted on one of these bases in the same medium as is suitable for the transposition, and which contains a halohydric acid and an alcohol having more than two atoms of carbon in the molecule and possibly some water, or in a different medium in which the transposition does not take place or takes place incompletely, but to which, by adding one or more reagents, the proper composition can be given in order that this reaction may be produced according to the process of the invention.

The diarylamines which can be converted into C-nitroso derivatives in this way include those which have their aryl groups separated from one another as in diphenylamine, 3:3'-dimethyl-diphenylamine, 4-methoxy-diphenylamine, 3-methoxy-diphenylamine, 2-phenylamino-naphthalene and 1-phenylamino-naphthalene and those in which they are connected by a bridge as in carbazole.

The nitrite employed as the reagent for introducing the nitroso group may be a metallic nitrite such as, for example, that of sodium, potassium, calcium, magnesium or lithium, or an alkyl nitrite such as, for example, those of the alcohols recommended in the invention which contain more than two atoms of carbon in the molecule.

The quantity of halohydric acid can vary widely, but practical operative conditions can be obtained if there are between 1 and 10 molecules of acid per molecule of starting material. Where the operation is carried out starting from the diarylamine and employing a metallic nitrite as the reagent for introducing the nitroso group, this quantity should be increased by that required for the conversion of this nitrite into nitrous acid. The amount of water present during the reaction can be varied widely, both when the starting material consists of an N-nitroso derivative of a diarylamine and when it is a diarylamine. Good results can thus be obtained by the use of a commercial halohydric acid, or an even more dilute acid, as the transposition agent. The necessity to use anhydrous halohydric acid or an acid chloride as in the known processes is thus avoided. The reaction temperature is not fixed in the invention but temperatures of 0° C. to 50° C. appear to be the most advantageous. In addition to the substances indicated above, the invention likewise comprises the use of organic solvents such as ether, dichlorodiethylether, chloroform, benzene, toluene, and chlorobenzene.

While studying the process of the invention, it has been found that, other things being equal, the speed of the reaction and the yields are increased when water-soluble mineral salts, e. g. chlorides, are introduced into the reaction medium. Among these salts there may be mentioned, for example, sodium and lithium chlorides, magnesium sulphate, and the chlorides of magnesium, calcium and zinc. By using these salts excellent yields can be obtained while employing a relatively large amount of water or relatively small amounts of the halohydric acid or the alcohol containing more than two atoms of carbon in the molecule.

In the foregoing text, the term transposition does not imply any hypothesis with regard to the mechanism of the conversion of the N-nitroso-diarylamine into C-nitroso-diarylamine. It is indeed possible that the latter results in fact from a removal of the nitroso group from the nitrogen with subsequent re-introduction of a nitroso group on the carbon, and it may not then be a true transposition.

The following examples, in which the parts given are parts by weight unless the contrary in indicated, illustrate the invention without limiting it.

*Example 1*

A mixture of 147 parts of an aqueous solution containing 34.4 g. of hydrochloric acid per 100 g., 50 parts on N-nitroso-diphenylamine and 250 parts by volume of normal propyl alcohol is agitated at 25° C. for 16 hours. This mixture is then poured into 2,600 parts of water and neutralised with 75 parts of sodium carbonate. The precipitate of the 4-nitroso-diphenylamine is filtered, the compound thus obtained being very pure and in good yield. It may be dissolved in soda and reprecipitated by an acid.

A similar result is obtained if the normal propyl alcohol is replaced by isopropyl alcohol.

*Example 2*

A mixture of 147 parts of the solution of hydrochloric acid used in Example 1, 50 parts of N-nitroso-diphenylamine and 250 parts by volume of normal butyl alcohol is agitated at 25° C. for 16 hours; the mixture is diluted with 250 parts of water, neutralised with 75 parts of sodium carbonate, and the mixture is distilled under a pressure of 30 mm. of mercury so as to remove the butyl alcohol. The 4-nitroso-diphenylamine is then filtered and obtained in good yield.

*Example 3*

130 parts of an aqueous solution of hydrobromic acid containing 54 g. of hydrobromic acid in 100 g. are added over 10 minutes to a mixture of 50 parts of N-nitroso-diphenylamine and 250 parts by volume of normal butyl alcohol, and the mixture is agitated at 25° C. for 4 hours. The mixture is poured into 3,200 parts of water, neutralised with sodium carbonate and the precipitate of the 4-nitroso-diphenylamine is filtered. The latter is thus obtained in good yield.

*Example 4*

A mixture of 147 parts of an aqueous solution containing 34.4 g. of hydrochloric acid in 100 g., 50 parts of N-nitroso-diphenylamine and 250 parts by volume of commercial isoamyl alcohol is agitated at 25° C. for 16 hours, and then diluted with 350 parts of water, neutralised with 75 parts of sodium carbonate, and the mixture distilled under a pressure of 30 mm. of mercury, in order to eliminate the isoamyl alcohol. The 4-nitroso-diphenylamine is subsequently filtered, the yield being very good.

*Example 5*

A mixture of 93 parts of the solution of hydrochloric acid used in Example 1, 37.5 parts of commercial dry calcium chloride (containing 20% of water), 120 parts by volume of normal butyl alcohol and 50 parts of N-nitroso-diphenylamine is agitated at 25° C. for 4 hours; it is diluted with 2,000 parts of water, neutralised with 45 parts of calcium carbonate and the precipitated 4-nitroso-diphenylamine is filtered. The latter is obtained in excellent yield.

When the calcium chloride in the preceding example is replaced by the same weight of anhydrous zinc or magnesium chloride the same final product is obtained in very good yield.

*Example 6*

Into an agitated mixture maintained at 25° C., of 43 parts of diphenylamine, 200 parts by volume of butyl alcohol, 135 parts of the solution of hydrochloric acid used in Example 1, and 30 parts of commercial dry calcium chloride (containing 20% of water), 18 parts of sodium nitrite are slowly introduced and, after this addition, the mixture is agitated for a further one and a half hours at the same temperature (25° C.). The mixture is diluted with 250 parts of water, neutralised with 52 parts of calcium carbonate and distilled under a pressure of 30 mm. of mercury so as to remove the butyl alcohol. The 4-nitroso-diphenylamine is then filtered, and is obtained in this way in very good yield.

*Example 7*

23 parts of N-nitroso-3:3′-dimethyl-diphenylamine, 100 parts by volume of butyl alcohol, 59 parts of the hydrochloric acid used in Example 1, and 20 parts of calcium chloride are agitated together at 25° C. for 4 hours. The mixture is then diluted with 1,300 parts of water and neutralised with about 29 parts of calcium carbonate. The 4-nitroso-3:3′-dimethyl-diphenylamine is filtered, and is thus obtained in excellent yield.

*Example 8*

100 parts by volume of chloroform, 10 parts by volume of butyl alcohol, 135 parts of the hydrochloric acid used in Example 1, 30 parts of commercial dry calcium chloride (containing 20% of water), and 50 parts of N-nitroso-diphenylamine are agitated together at 25° C. for an hour. The mixture is then poured on to 800 parts of water and ice and 160 parts of caustic soda containing 33 g. of sodium hydroxide per 100 g., and is then agitated. The aqueous layer is decanted, and the 4-nitroso-diphenylamine is precipitated therefrom by the addition of hydrochloric acid and it is filtered. The product is thus obtained in excellent yield.

*Example 9*

50 parts of N-nitroso-diphenylamine, 200 parts by volume of butyl alcohol, 141 parts of an aqueous solution containing 34.4 g. of hydrochloric acid per 100 g., and 35 parts of dry lithium chloride are agitated at 25° C. for 2 hours. The mixture is diluted to 2,500 parts and neutralised with 71 parts of sodium carbonate; the 4-nitroso-diphenylamine is then filtered, being obtained in excellent yield.

When the lithium chloride in the preceding example is replaced by sodium chloride, the same final product is obtained in good yield.

*Example 10*

59 parts of an aqueous solution containing 34.4 g. of hydrochloric acid per 100 g. are added at 3° C. over half an hour to a mixture of 20 parts of 3-methoxy-diphenylamine, 100 parts by volume of butyl alcohol, 20 parts of anhydrous calcium chloride and 7 parts of sodium nitrite. The temperature of the mixture is then raised to 25° C. and this temperature is maintained for 2 hours. The mixture is diluted with 1,300 parts of water and neutralised with calcium carbonate and the precipitated 4-nitroso-3-methoxy-diphenylamine is filtered.

We claim:

1. A process for the preparation of a C-nitrosodiarylamine from the corresponding N-nitrosodiarylamine, which comprises treating said N-nitrosodiarylamine with an aqueous solution of a hydrogen halide in the presence of a lower alkyl alcohol containing more than two atoms of carbon in the alkyl radical, and maintaining the aqueous mixture agitated at a temperature in the range of 0–50° C.

2. A process for the preparation of a C-nitrosodiarylamine from the corresponding N-nitrosodiarylamine, which comprises treating said N-nitrosodiarylamine with an aqueous solution of a hydrogen halide in the presence of a lower alkyl alcohol containing more than two atoms of carbon in the alkyl radical and a salt selected from the group consisting of lithium chloride, calcium chloride, magnesium chloride and zinc chloride, said salt being present in a quantity insufficient to cause any appreciable drying of the aqueous mixture, and maintaining the aqueous mixture agitated at a temperature in the range of 0–50° C.

3. The process as defined in claim 1, wherein the N-nitrosodiarylamine is N-nitrosodiphenylamine.

4. The process as defined in claim 1, wherein the hydrogen halide is hydrochloric acid.

5. The process as defined in claim 1, wherein the hydrogen halide is hydrobromic acid.

References Cited in the file of this patent

UNITED STATES PATENTS

| | | |
|---|---|---|
| 2,046,356 | Wyler et al. | July 7, 1936 |
| 2,419,718 | Kehe | Apr. 29, 1947 |
| 2,495,774 | Roberts | Jan. 31, 1950 |
| 2,560,892 | Roberts | July 17, 1951 |
| 2,560,893 | Roberts | July 17, 1951 |
| 2,560,894 | Roberts | July 17, 1951 |

OTHER REFERENCES

Marqueyrol et al., "Bull. soc. chem." (1914), vol 15, pp. 510–513.

Hodgman: "Handbook of Chem. and Physics" (1940), 31st ed., pp. 418–419, 462–465, and 544–545.